United States Patent
Edwards et al.

(10) Patent No.: US 9,081,914 B2
(45) Date of Patent: Jul. 14, 2015

(54) COMPONENT CONFIGURATION SYSTEM AND METHODS OF OPERATING SAME

(75) Inventors: William Talion Edwards, Foristell, MO (US); Timothy Joseph Josten, St. Peters, MO (US); Scott Randall Greene, Defiance, MO (US); Michael L. Piasse, St. Charles, MO (US); Andrew Wall, O'Fallon, MO (US); William E. Wojczyk, Jr., O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 567 days.

(21) Appl. No.: 13/463,253

(22) Filed: May 3, 2012

(65) Prior Publication Data

US 2013/0297633 A1 Nov. 7, 2013

(51) Int. Cl.
*G06F 17/30* (2006.01)
*G06F 17/50* (2006.01)

(52) U.S. Cl.
CPC ............ *G06F 17/50* (2013.01); *G06F 17/5095* (2013.01); *G06F 2217/02* (2013.01); *Y02T 10/82* (2013.01)

(58) Field of Classification Search
CPC ....................................................... G06F 17/50
USPC ........................................................ 707/758
See application file for complete search history.

(56) References Cited

U.S. PATENT DOCUMENTS

| 2006/0015777 | A1* | 1/2006 | Loda ............................... 714/38 |
| 2008/0310754 | A1 | 12/2008 | Safai et al. |
| 2009/0326694 | A1* | 12/2009 | Stephens et al. ............... 700/98 |
| 2010/0223163 | A1 | 9/2010 | Edwards |
| 2011/0131016 | A1* | 6/2011 | Stolper ............................. 703/1 |

* cited by examiner

*Primary Examiner* — Jensen Hu
(74) *Attorney, Agent, or Firm* — Armstrong Teasdale LLP

(57) ABSTRACT

A system and methods to record a configuration record for components of an asset is provided. The system includes a user interface device comprising a screen having a plurality of attributes and a plurality of link hotspots coupled to the plurality of attributes. A database is coupled to the user interface device, wherein the database includes an aspect associated with each of the plurality of attributes. The system includes a processor coupled to the user interface device and the database, wherein the processor configured to couple the aspect to the plurality of link hotspots.

20 Claims, 11 Drawing Sheets

COMPONENT CONFIGURATION SYSTEM AND METHODS OF OPERATING SAME

BACKGROUND OF THE INVENTION

The present disclosure relates to a record system and more specifically, to methods and systems for recording a configuration record for an asset.

Asset maintenance and/or modification is an ongoing occurrence for assets that have a relatively long in-service lifespan and include a large capital investment, such that maintenance and/or modification is preferable over asset replacement. Assets such as aircraft, maritime vessels, automobiles, and other large investment assemblies routinely undergo maintenance and/or modification at regular intervals to maintain the vehicles and occasionally upgrade the vehicles with new components to improve vehicle performance.

In order to organize the configuration of components of the asset, some organizations obtain attributes of the asset, and then attempt to categorize those attributes after the fact into some sort of organization such as folders in a file cabinet or in 3-ring binders. More particularly, some of the attributes can be used to document configurations, for example wiring and/or hydraulics, of some known legacy assets and to allow for designs of modification kits over life of the asset. Some of the attributes, however, may be only available to only those aware of them, and may be left in a non-digital state which limits and/or prevents sharing the attributes with others in the organization. Moreover, some known attributes do not carry contextual information, such as component identification and/or positions within the asset limiting the effectiveness of the attributes.

Some organizations consult the attributes in developing proposed modification concepts to facilitate component identification and location, and in determining design space that is available for modifications, as well as configuration differences across vehicles. Some current methods, however, can be very time consuming, wrought with interpretation errors, and may not provide widespread access across the program. Organizations managing assets with known configurations may not have a structured method to manage captured general and specific asset aspects such as images, photographs, and X-rays. Moreover, known organizational methods may not include a structured method to efficiently organize attributes electronically as those attributes are collected. Further, some known programs include a regimented photo survey based on a predefined configuration. Deviations from this configuration, however, may have to be handled outside the scope of the organization. The reliance on administrative control, as opposed to an organized linkable architecture structure, however, may present errors in associating aspect information to the attributes resulting in uncertainty of specific configurations for the components.

A program to systematically collect and organize assets in a configuration that can be used by personnel throughout the organization would enhance better utilization of component data and lead to improved collaboration across the program. In addition, the ability to compare aspects of similar assets and different instances of assets, or the same aspects at different points in time would enhance organizational methods.

BRIEF DESCRIPTION OF THE INVENTION

In one aspect, a computer-implemented method of recording a configuration record for components of an asset is provided. The computer-implemented method includes displaying a first attribute associated with a first component of the asset and inputting, via a user interface device, a first aspect that is associated with the first component. A link hotspot that is coupled to the first attribute is selected. The computer-implemented method includes displaying a second attribute that is coupled to the link hotspot and associated with a second component of the asset. The computer-implemented method inputs, via the user interface device, a second aspect that is associated with the second attribute. The computer-implemented method includes storing the first and second attributes and the first and second aspects.

In another aspect, a computer system to record a configuration record for components of an asset is provided. The computer system includes a user interface device having a screen with a plurality of attributes and a plurality of link hotspots coupled to the plurality of attributes. A database is coupled to the user interface device, wherein the database includes an aspect associated with each of the plurality of attributes. The computer system includes a processor coupled to the user interface device and the database, wherein the processor is configured to couple the aspect to the plurality of link hotspots.

In a further aspect, a computer-implemented of evaluating a component of an asset is provided. The computer-implemented includes displaying a first attribute associated with a first component of the asset and inputting, via a user interface device, a first aspect that is associated with the first component. A link hotspot that is coupled to the first attribute is selected. The computer-implemented includes displaying a second attribute that is coupled to the link hotspot and associated with a second component of the asset. The computer-implemented inputs, via the user interface device, a second aspect that is associated with the second attribute. The computer-implemented includes storing the first and second attributes and the first and second aspects. The computer-implemented includes performing an evaluation on the asset based on the comparison of the first and second attributes.

DETAILED DESCRIPTION OF THE INVENTION

The embodiments described herein relate to configuration systems and methods of operating the system. More particularly, the embodiments relate to a system for generating, acquiring, organizing, recording and comparing attributes of components of an asset. Moreover, the embodiments are utilized in a variety of environments such as, but not limited to, military, civil, industrial, rail, shipping, aerodynamic and consumer environments. The embodiments described herein facilitate reducing maintenance time and downtime of assets to reduce maintenance costs and lost profits resulting from the asset downtime. Moreover, the embodiments described herein facilitate designing assets and/or asset components. A user interface device and host system facilitates part identification via a comparison process, which facilitates building a configuration record of the asset.

Figure 1:
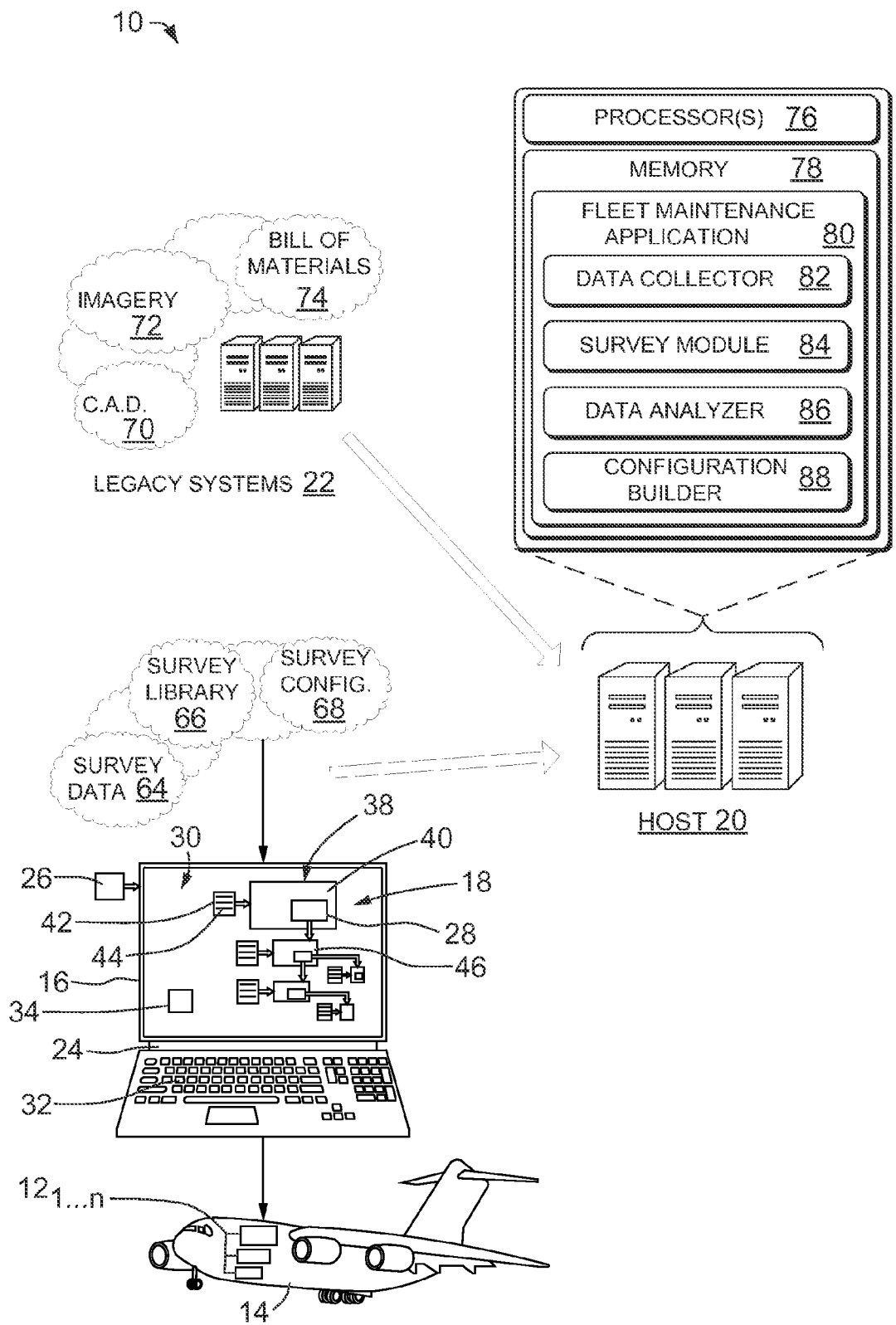
FIG. 1 illustrates a diagram of an exemplary configuration system that may be used to record components of an asset.
Figure 2:
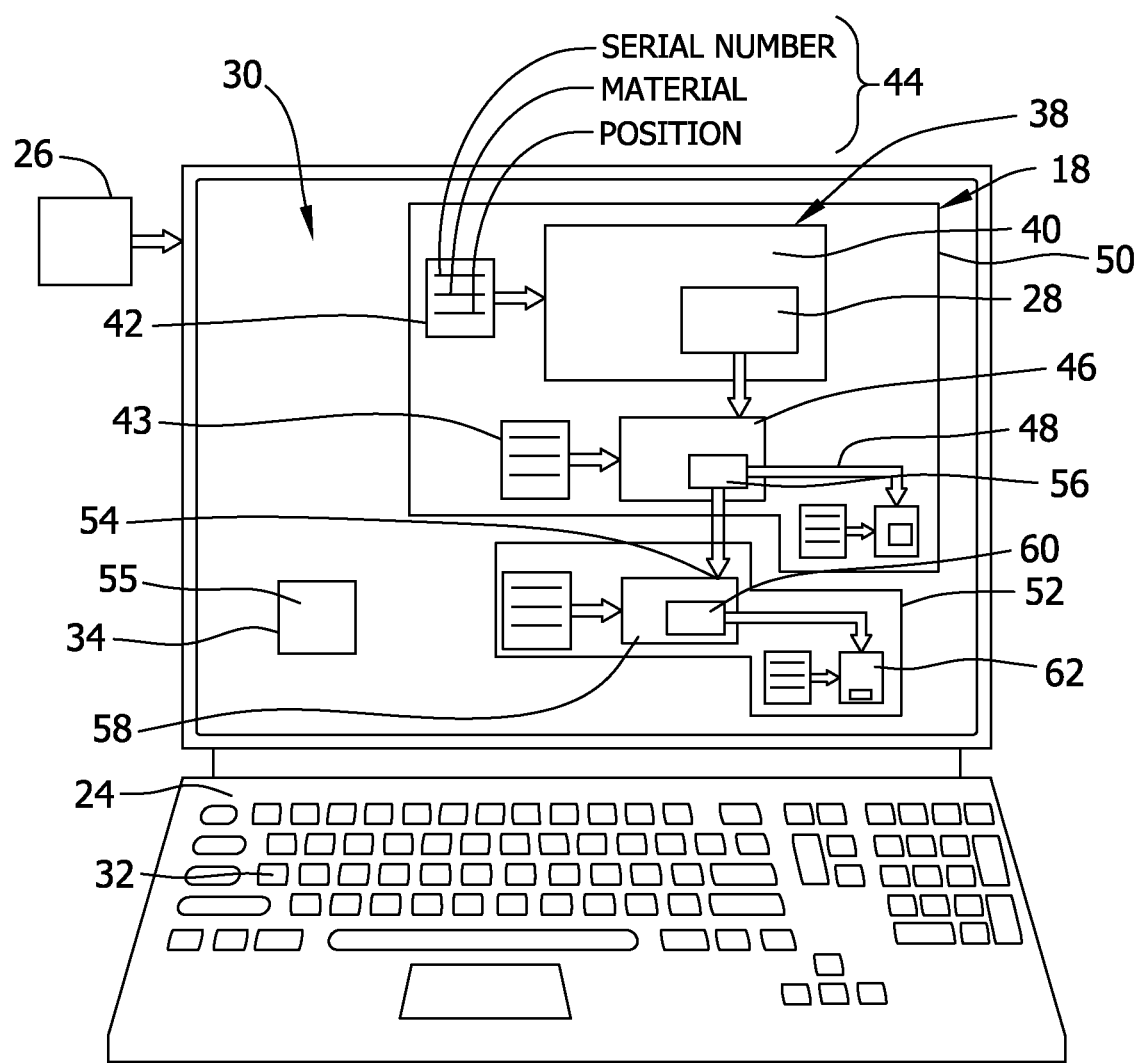
FIG. 2 illustrates a diagram of an exemplary user interface device of the configuration system shown in FIG. 1.

FIG. 1 illustrates a diagram of an exemplary configuration system 10 that is configured to facilitate configuring components $12_{1...n}$ of an asset 14. FIG. 2 illustrates a diagram of a user interface device 16 of system 10. System 10 is configured to record a configuration record 18 of asset 14. More particularly, system 10 is configured to at least acquire, create, edit, record, compare, display and store information associated with at least one component 12 of asset 14. In the exemplary embodiment, asset 14 includes a vehicle such as, but not limited, to an aircraft, a spacecraft, a launch vehicle, seaborne or undersea vessel, ground based vehicle, mechanical devices and/or after machinery. Alternatively, asset 14 can include structures, such as buildings; and infrastructure, for example, bridges. Asset 14 can include any article containing subcomponents. System 10 includes a host system 20 and a legacy system 22 coupled to user interface device 16. Alternatively, user interface device 16 can include host system 20 and legacy system 22 or capabilities of host system 20 and legacy system 22.

User interface device 16 includes a central processing unit 24, a surveyor 26, a link hotspot 28, a screen 30, an input device 32, such as for example a keyboard, and a database 34. In the exemplary embodiment, central processing unit 24 includes units such as, but not limited to, a laptop and a smart phone. Surveyor 26 includes a data acquisition device 36 such as, but not limited to, a digital camera. Moreover, surveyor 26 can include other acquisition devices (not shown) that include little or no human interaction. More particularly, surveyor 26 can include a computer controlled camera (not shown) that is configured to acquire an image of a vehicle from various locations via a position system (not shown). The position system may use tracks, dollies, mechanical arms, and/or other apparatus to move the camera to positions that have known positional data (e.g., 3D coordinates, etc.). Surveyor 26 can use various cameras to simultaneously survey the vehicle, among other possible techniques to efficiently survey the vehicle.

In the exemplary embodiment, user interface device 16 is configured to acquire an attribute $38_{1...n}$, such as a first attribute 40 of asset component 12, wherein screen 30 is configured to display first attribute 40. In another embodiment, database 34 can include first attribute 40 stored therein. First attribute 40 includes an image such as, for example, a two dimensional image of component 12. Alternatively, first attribute 40 can include other configurations such as, but not limited to, non-two dimensional images, backscatter data, non-destructive evaluation data, an ultrasound image, a video image, a chemical composition image and a thermal image. First attribute 40 can include any configuration to enable system 10 to function as described herein.

In the exemplary embodiment, user interface device 16 includes a first aspect 42 coupled to first attribute 40. First aspect 42 includes contextual data 44 associated with first component 12 of asset 14. In the exemplary embodiment, contextual data 44 includes information described with component 12 such as, but not limited to, a serial number, a bill of material, a component name, a component description, a component position, a component material, design and/or repair and/or maintenance and/or replacement instructions. Alternatively, contextual data 44 can relate to any information associated with component 12. User interface device 16 is configured to input, via keyboard, first aspect 42 associated with first attribute 40. Alternatively, database 34 can be configured to store first aspect 42 for associating with first attribute 40.

Aspect 42 can be acquired by a plurality of processes (not shown) such as, but not limited to, manual input by an operator (i.e., entering a serial number); automated entry (i.e., reading a bar code or a radio frequency identification tag); optical character recognition of text and a measurement device (distance measured by a distal micrometer). Aspect 42 can be acquired and coupled to attributes 38 by any process that enables system 10 to function as described herein.

Link hotspot 28 is coupled to first attribute 40. More particularly, link hotspot 28 is configured to couple first attribute 40 to a second attribute 46 which is displayed via screen 30. Second attribute 46 includes a two dimensional image of component 12. Alternatively, second attribute 46 can include other configurations such as, but not limited to, non-two dimensional images, backscatter data, non-destructive evaluation data, an ultrasound attribute, a video attribute, a chemical composition attribute and a thermal attribute. Second attribute 46 can include any configuration to enable system 10 to function as described herein. In the exemplary embodiment, user interface device 16 includes a second aspect 43 coupled to second attribute 46. Second aspect 43 includes contextual data 44 associated with second component $12_2$ of asset 14.

In the exemplary embodiment, first attribute 40 includes a plurality of link hotspots $28_{1...n}$ that are configured to couple first attribute 40 to a plurality of second or additional attributes $46_{1...n}$. Moreover, each attribute 46 of the plurality of attributes 46 includes a plurality of additional link hotspots $28_{1...n}$. The coupling of attributes 40 and 46 with link hotspots 28 facilitates generating horizontal and/or vertical architectural branches 48 for attributes 40 and 46, link hotspots 28, and associated asset components 12. In the exemplary embodiment, user interface device 16 is configured to record configuration record 18 by acquiring attributes 40 and 46, aspects 42 and 43 and/or link hotspots 28 via commands entered in keyboard 32.

In the exemplary embodiment, user interface device 16 is configured to generate and record a first instance 50 of configuration record 18. First instance 50 includes predetermined information branches 48 of attributes 40, link hotspots 28 and aspects 42 compiled together. Moreover, user interface device 16 is configured to generate and record a second instance 52 of configuration record 18. Second instance 52 includes information branches 48 of attributes 46, link hotspots 28 and aspects 43 compiled together. In the exemplary embodiment, branches 48 of first instance 50 include initiation points 54 for second instance 52, wherein second instance 52 is configured to use and/or or inherit information branches 48 of first instance 50. User interface device 16 is configured to compare and contrast first instance 50 and second instance 52 to facilitate analyzing components 12 and compiling differences between attributes, aspects and/or link hotspots between first instance 50 and second instance 52. User interface device 16 is configured to generate a difference record 55 based on the comparison of first instance 50 and second instance 52. In the exemplary embodiment, database 38 is configured to store difference record 55. Any level of previously identified instance of configuration record can be reused from asset to another asset (not shown).

As an illustrative example, first attribute 40 illustrates asset 14 (i.e., a vehicle) and first link hotspot 28 couples first attribute 40 to second attribute 46 that is illustrating asset component 12 (i.e., an engine of vehicle). A second link hotspot 58 of second attribute 46 is coupled to a third attribute 58 that illustrates another vehicle component 12 (i.e., an air filter of vehicle engine). A third link hotspot 60 of third attribute 58 is coupled to a fourth attribute 62 that illustrates another vehicle component 12 (i.e., an air filter pleat). Moreover, in the illustrative embodiment, aspects 42 associated with vehicle components 12 are coupled to respective attributes 40, 46, 58 and 62. User interface device 16 is configured to repeat the process based on associated attributes and link hotspots 28 to generate and/or record configuration record 18 for vehicle components 12.

In the illustrative embodiment, first instance 50 includes first attribute 40 (i.e., vehicle); second attribute 46 (i.e., engine) and third attribute 58 (i.e., air filter). In to addition to the structure of first instance 50, second instance 52 can include other attributes (i.e., vehicles using a different type and/or quantify of air filter) to facilitate user interface device 16 to compare and contrast differences of first instance 50 and second instance 52 to analyze subsequent attributes of second instance 52. Alternatively, first instance 50 and second instance 52 can include attributes of same component 12 of asset 14 at different points in time to compare and compile difference of attributes. More particularly, attributes of components 12 can be compared for condition changes during operating life of asset 14. In this illustrative embodiment, user interface device 16 is configured to compare second instance 52 relating to an "as maintained/current" status of asset 14 as compared to first instance 50 relating to an "as designed" status. System 10 facilitates dynamic generation and/or recordation of structure and/or architecture of configuration record 18 to provide subsequent users to re-use all or part of any previously created and/or recorded structures for configurations 18.

To facilitate generation and/or recordation of configuration record 18, database 34 includes information compiled in a survey data 64, a survey library 66 and a survey configuration 68. User interface device 16 is configured to communicate survey data 64, survey library 66 and survey configuration 68 to host system 20. Survey data 64 includes information collected from observing existing components 12 and/or complete asset 14 and survey library 66 includes existing information. In the exemplary embodiment, survey data 64 includes photographs or other imagery, measurements, and other information gained through human-based and/or machine-based observation of asset 14. Survey library 66 includes various 2D imagery (e.g., digital photography, thermo photography, x-ray imaging, etc.), or other types of imagery (e.g., optical metrology, etc.) that may be used to identify unknown information during a subsequent inquiry via a comparison process. The data in survey library 66 may be supplemented with additional aspects, such as part numbers, part descriptions, measurements, position information, or other data relevant to component 12.

Survey configuration 68 includes 2D imagery of component 12 that may be scheduled for maintenance. Alternatively, survey configuration 68 can include 2D imagery to design aspect 14. In the exemplary embodiment, survey library 66 and survey configuration 68 include other data such as position information, human generated reports, reverse engineering data, measurements, part identifiers (e.g., item number, etc.), or other data extracted from asset 14 (or portion thereof) via a human or machine. Host system 20 is configured to compare survey configuration 68 to other data, such as survey library 66, to populate fleet maintenance data and determine configuration record 18 of component 12 that has scheduled maintenance.

Legacy system 22 is configured to communicate additional information to user interface device 16 and/or host system 20. Legacy system 22 includes integrated and/or disparate systems (not shown) made up of servers that host a wide range of part information. In the exemplary embodiment, legacy system 22 includes data such as, but not limited to, CAD data 70, imagery 72, and bill of materials (BOMs) 74. CAD data 70 includes 2D and 3D models of component 12 and/or asset 14. Imagery 72 includes photographs, optical metrology, x-rays, or other imagery that may provide graphical information about component 12. BOM 74 provides non-graphical information associated with component 12.

Host system 20 includes one or more processors 76 and memory 78. Memory 78 includes applications, modules, and/or data. More particularly, memory 78 includes a fleet maintenance application 80, which may facilitate populating fleet maintenance data by collecting information about asset 14 from user interface device 16 and/or legacy system 22. Fleet maintenance application 80 includes a number of modules such as a data collector 82, a survey module 84, a data analyzer 86, and a configuration builder 88. Alternatively, memory 78 may include applications, modules and/or data for an initial design of aspect 14. Data collector 82 is configured to facilitate obtaining data from legacy system 22, wherein data collector 82 may format data or otherwise modify the data to enable further analysis of the data. For example, imagery data may be converted to a particular format of attributes, which may enable rapid comparison of attributes or feature identification within the attributes.

Survey module 84 is configured to access survey data 64 and/or survey library 66 and to interact user interface device 16 to facilitate generating survey configuration 68. Data analyzer 86 is configured to compare survey configuration 68 to existing data from various sources (e.g., survey library 66 and/or legacy system 22) to facilitate identifying component 12. For example, data analyzer 86 is configured to determine a unique feature of a 2D attribute of component 12 obtained from survey configuration 68. Data analyzer 86 compares feature to attributes stored in survey library 66 to facilitate recording a list of matching parts, which are further analyzed to determine which part is included in survey configuration 68. Configuration builder 88 is configured to create configuration record 18 of asset 14 based on the output of data analyzer 86. In one embodiment, configuration builder 88 is configured to facilitate generating revised BOM 74 (or complete BOM in some instances). Alternatively, configuration builder 88 can generate a 3D model (not shown) of asset 14, such as, for example, a layout model, an exploded view model, CAD model, or rudimentary 3D model of asset 14.

Figure 3:
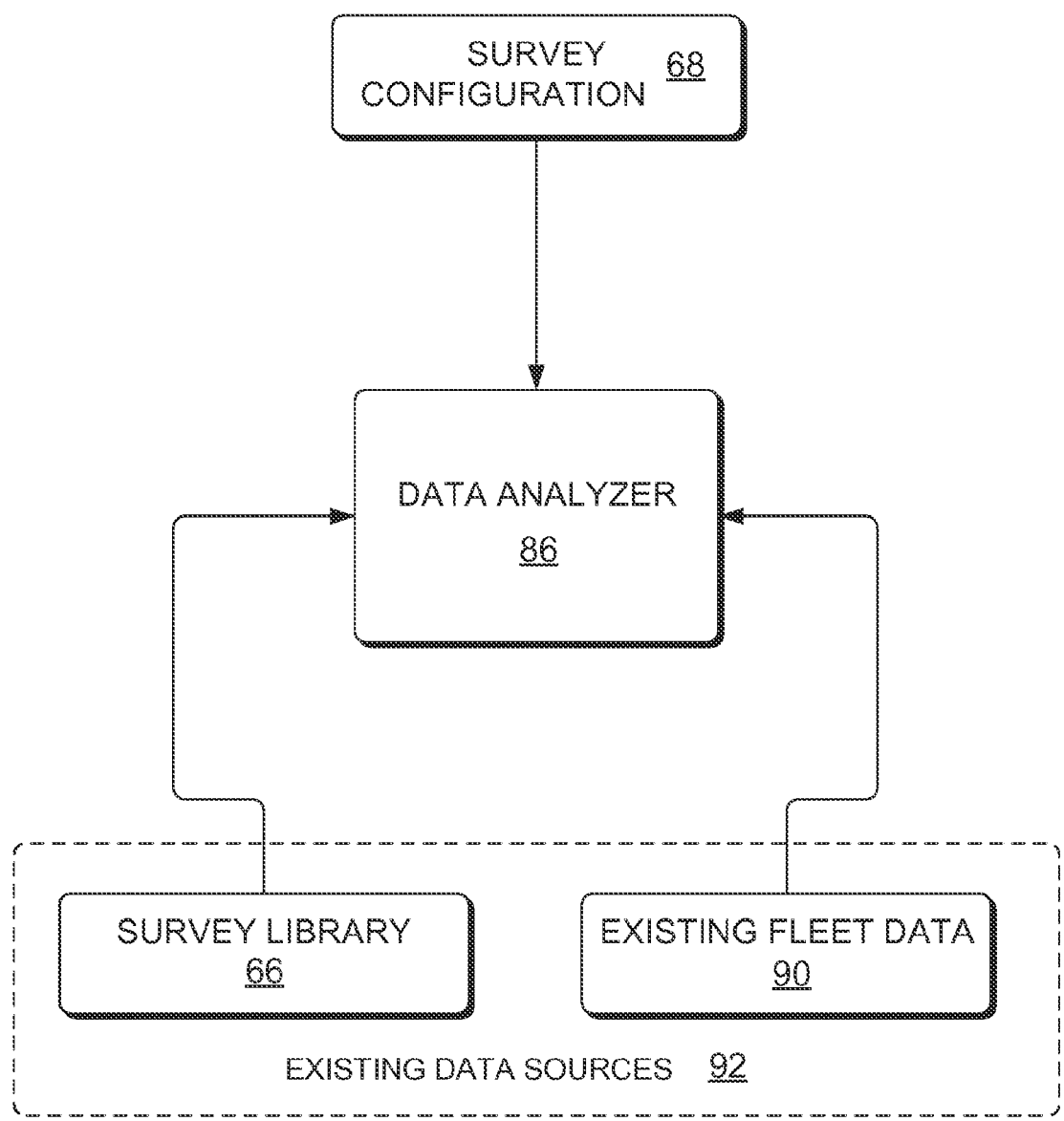
FIG. 3 illustrates a diagram of an exemplary analyzer of the system shown in FIG. 1.

FIG. 3 illustrates a schematic diagram of data analyzer 86. Data analyzer 86 is configured to receive survey configuration 68, which may be obtained by user interface device 16 (shown in FIG. 1) under the direction of survey module 84 (shown in FIG. 1). Survey module 84 is configured to direct surveyor to generate and/or record survey data of a particular aspect of survey configuration 68 (e.g., photograph of component 12 from a particular perspective), which may include 2D imagery of asset 14 designated for design and/or maintenance.

Data analyzer 86 is configured to receive data from existing data sources 92, such as survey library 66 and existing fleet data 90. Fleet data 90 includes existing definition data stored and managed by the legacy system 22 (shown in FIG. 1). Data analyzer 86 is configured to compare data received from survey configuration 68 to survey library 66 to identify asset component 12. Data analyzer 86 is configured to compare characteristic features of a survey configuration attribute to survey attributes in survey library 66 to identify component 12 to obtain further information about component 12 from the existing data sources 92 including CAD data 70, imagery 72, and/or BOM 74.

In the exemplary embodiment, data analyzer 86 is configured to obtain and manipulate spatial/position information obtained from survey configuration 68 in reference to the existing fleet data 90. Data analyzer 86 is configured to facilitate construction of a 3D model (e.g., via configuration builder 88) by obtaining component 12 information and combining it with spatial/position information. Data analyzer 86 is configured to manipulate data to enable updating BOM 74 and generate at least a portion of a 3D model of asset 14 designated for design and/or maintenance by comparing survey configuration 68 to existing data sources 92.

Figure 4:
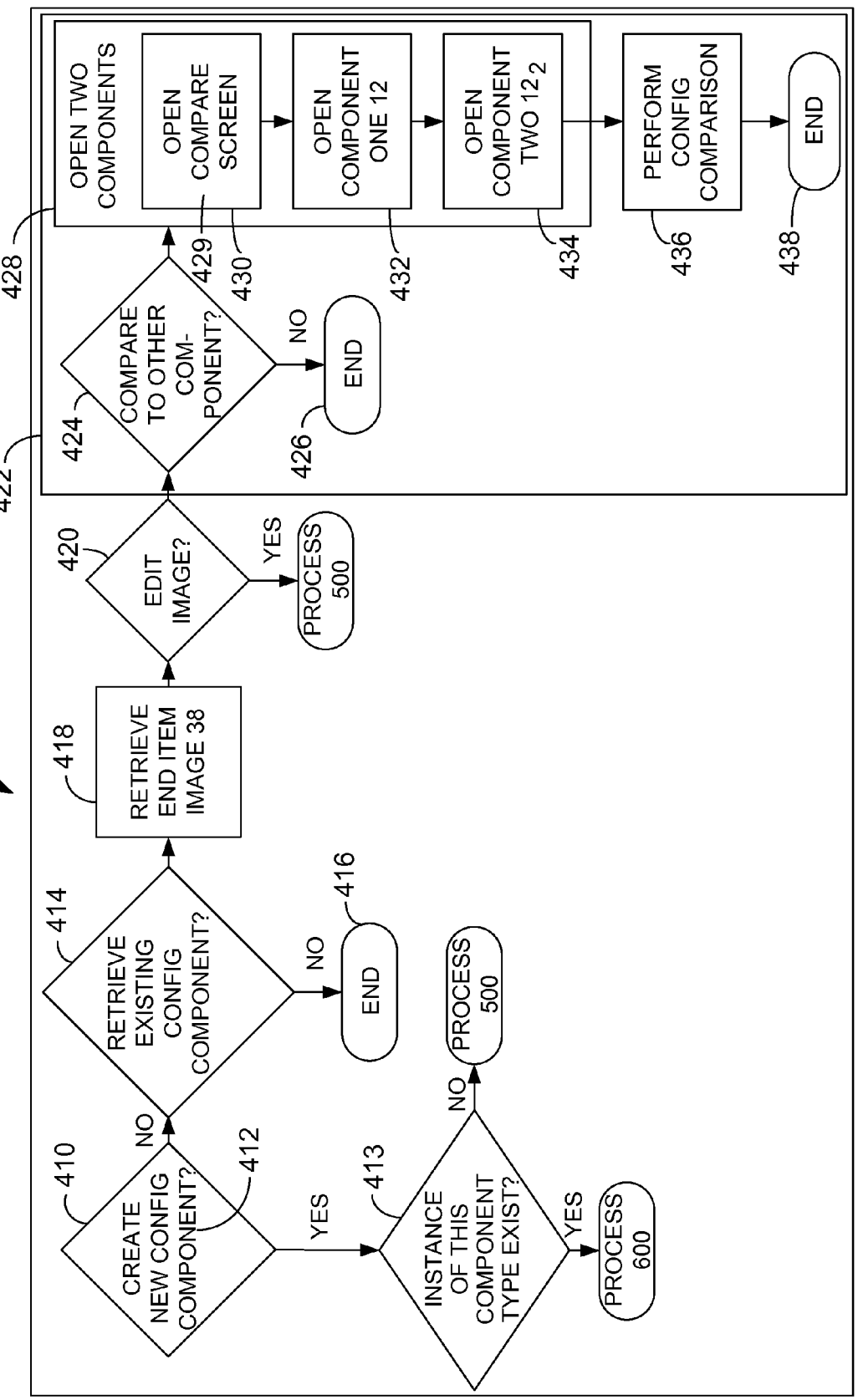
FIG. 4 illustrates a flow diagram of an exemplary process to record a configuration and to compare asset components shown in FIG. 1.
Figure 5:
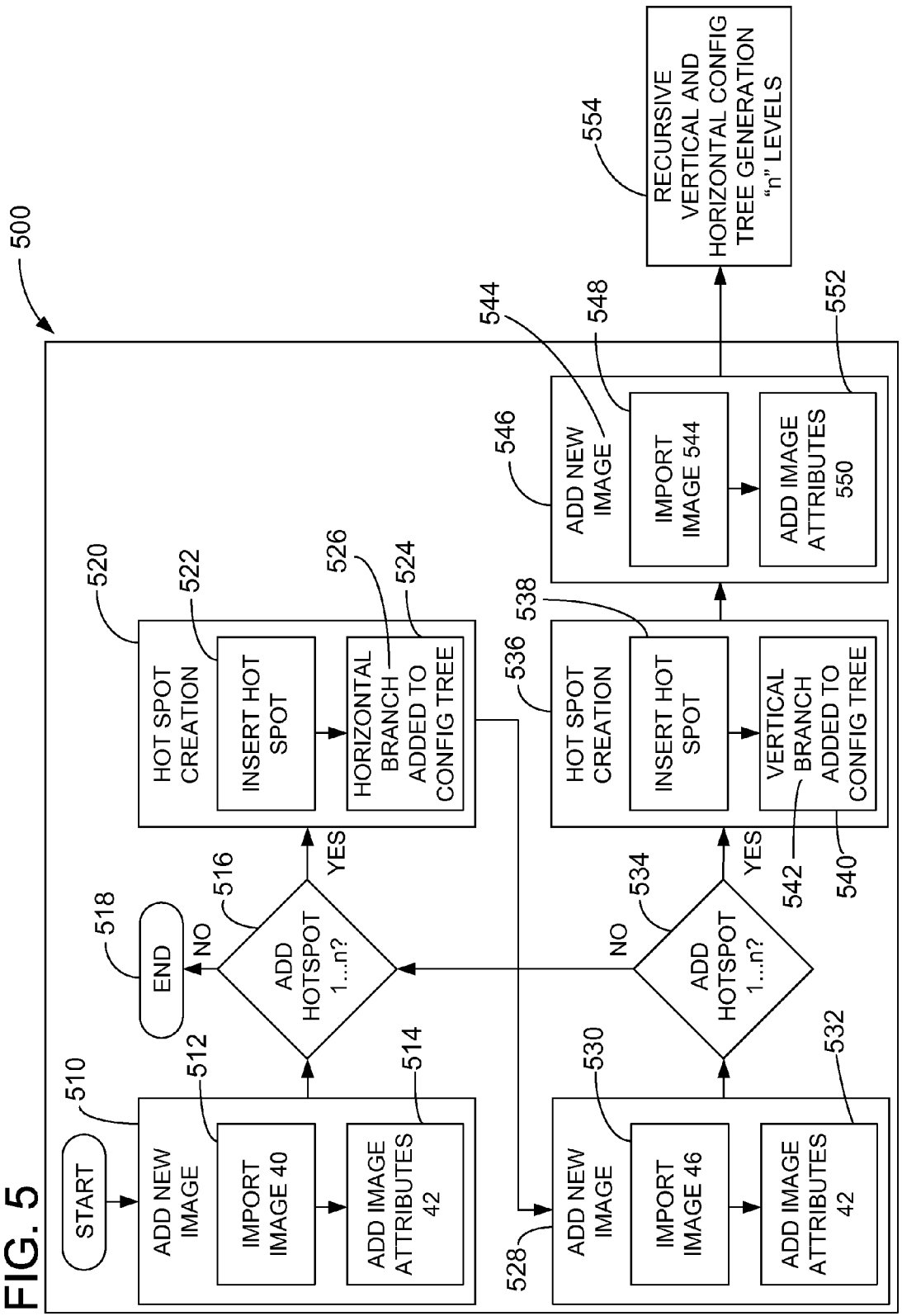
FIG. 5 illustrates a flow diagram of an exemplary process to generate a first instance of the configuration shown in FIG. 4.
Figure 6:
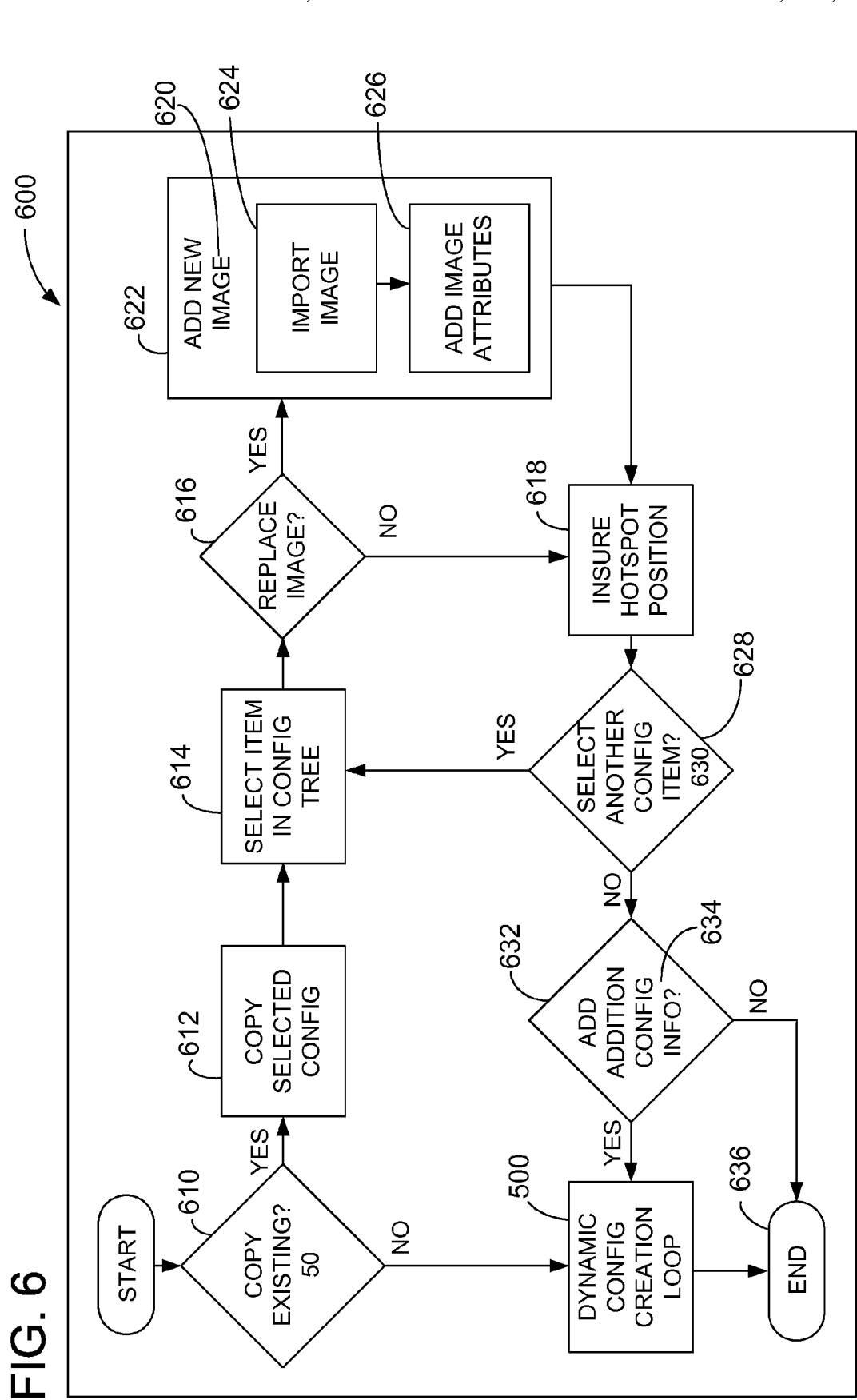
FIG. 6 illustrate a flow diagram of an exemplary process to record a second instance of configuration shown in FIG. 4.

FIG. 4 illustrates a flow diagram of an exemplary process 400 to record configuration record 18 and compare asset components 12. FIG. 5 illustrates a flow diagram of an exemplary process 500 to record first instance 50 of configuration record 18. FIG. 6 illustrates a flow diagram of an exemplary process 600 to record second instance 52 of configuration record 18. Processes 400, 500 and 600 are illustrated as a collection of blocks in a logical flow graph, which represent a sequence of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components and data structures that perform particular functions or implement particular abstract data types. The order in which the operations are described is not intended to be construed as a limitation, and any number of the described blocks can be combined in any order and/or in parallel to implement the process. Other processes described throughout this disclosure, in addition to process processes 400, 500 and 600, shall be interpreted accordingly. Processes 400, 500 and 600 may be performed, at least in part, by user interface device 16 (shown in FIG. 1).

FIG. 4 illustrates process 400 that is configured to acquire and/or compare first attribute 40 and second attribute 46 of configuration record 18. If at decision block 410, the decision is made to generate a new configuration 412, process 400 proceeds to decision block 413. At decision block 413, a determination is made as to whether an instance, first example, first instance 50 or second instance 52, of configuration 412 exists. If not, process 400 proceeds to process 500 (shown in FIG. 5) as described herein. If instance configuration already exists, process 400 proceeds to process 600 (shown in FIG. 6) as described herein.

If at decision block 410, the decision is made not to generate new configuration 412, a determination is made whether to retrieve existing configuration record 18 for component 12. If not, then at block 414, user interface inquires whether to retrieve existing attribute 38 for component 12. If not, process 400 ends at block 416. If user decides to retrieve existing attribute 38 for component 12, user interface device 16 retrieves attribute 38 at block 418. At decision block 420, a determination is made to edit attribute 38. If user decides to edit attribute 38, process 400 proceeds to process 500 (shown in FIG. 5) as described herein.

If the determination is not to edit attribute 38, process 400 proceeds to a comparison configuration process 422. At decision block 424, a determination is made whether to compare component 12 to another component $12_n$. If not, process 400 ends at block 426. If user decides to compare components 12 at block 428, user interface device 16 opens a compare screen 429 at block 430. More particularly, user interface opens first attribute 40 associated with first component 12 at block 432 and opens second attribute 46 associated with second component $12_2$ at block 434. User interface device 16 is configured to compare at block 436 between first attribute 40 and second attribute 46. User interface device 16 is configured to compile, analyze, record, display and/or store in database differences of first instance 50 and second instance 52. Upon completion of comparison process 120, process 400 ends at block 130.

FIG. 5 illustrates process 500 to record first instance 50 of asset configuration record 18. In the exemplary embodiment, process 500 facilitates importing attributes 38, adding aspects 42 and inserting link hotspots 28 to user interface device 16. At block 510, first attribute 40 is coupled to user interface device 16. More particularly, first attribute 40 is imported and coupled to user interface device 16 at block 512. At block 514, aspect 42 is coupled to first attribute 40. Moreover, at decision block 516, a determination is made to add link hotspot $28_{1 \ldots n}$. If link hotspot 28 is not added, process 500 ends at block 518. If user decides to add link hotspot 28, link hotspot $28_n$ is created at block 520. More particularly, link hotspot 28 is coupled to first attribute 40 at block 522.

Link hotspot 28 is designated at block 524 as a branch 526 coupled to configuration record 18. In the exemplary embodiment, subsequent link hotspot $28_n$ is coupled to first attribute 40 as horizontal branch 526 to configuration record 18. Alternatively, link hotspot 28 can be coupled to first attribute 40 as a vertical branch (not shown) to configuration. For link hotspot 28, second attribute 46 is coupled to user interface device 16 at block 528. Second attribute 46 is imported at block 530 and aspect 43 is coupled to second attribute 46 at block 532.

At decision block 534, a determination is made whether to couple additional link hotspot $28_{1 \ldots n}$ to configuration record 18. If not, process 500 is configured to facilitate repeating cycle by proceeding to decision block 516. If user decides to add link hotspot 28, link hotspot $28_n$ is generated at block 536. More particularly, link hotspot $28_n$ is coupled to attribute at block 538. In the exemplary embodiment, link hotspot $28_n$ is coupled to attribute at block 540 as a vertical branch 542 of configuration record 18. Alternatively, link hotspot 28 can be coupled as a horizontal branch configuration (not shown).

For link hotspot $28_n$, another attribute 544 is coupled to user interface device 16 at block 546. Attribute 544 is imported at block 548 and aspect 550 is coupled to attribute 544 at block 552. The generation of link hotspots 28 and addition of respective attributes 544 and aspects 550 is repeated by user interface device 16 to facilitate generating recursive vertical and horizontal branches 48 of configuration record 18 for $levels_{1 \ldots n}$ at block 554.

FIG. 6 is illustrates process 600 to record second instance 52 of existing configuration record 18. At decision block 610, a determination is made as to whether to copy first instance 50 of configuration record 18. If a decision is made to not copy existing first instance 50, then process 600 is configured to proceed to process 500 (shown in FIG. 5). In the alternative, at block 612, existing configuration record 18 is replicated.

Attribute 38 is selected from configuration at block 614. At decision block 616, a determination is made whether to replace attribute 38. If not, then process 600 is configured to couple link hotspot 28 to attribute 38 at block 618. Alternatively, if a decision is to replace attribute 38, process 600 is configured to couple new attribute 620 at block 622. More particularly, attribute 620 is imported and coupled to user interface at block 624 and aspect 42 is coupled to attribute at block 626.

After coupling aspect 42 to attribute 620, process 600 is configured to insure link hot spot position at block 618. At decision block 628, a determination is made whether to select another attribute 630 in configuration. If another attribute 630 is selected, process 600 is configured to facilitate repeating attribute selection loop by proceeding to block 614. If a decision is made not to select another attribute 630 at block 628, then at decision block 632, a determination is made to generate another instance 634 of configuration. If not, process 600 ends at block 636. Alternatively, if user decides to generate another instance of configuration, process 600 is configured to repeat process 500 (shown in FIG. 5).

To facilitate processes 400, 500 and 600, data analyzer 86 (shown in FIGS. 1 and 3) is configured to facilitate developing a characterization of components 12 of asset 14 by comparing obtained data (e.g., the survey configuration 68) to recognized features contained in collected data (e.g., the survey library 66).

Data analyzer 86 is configured to build database 34 of components 12. Database 34 of components 12 may include portions of the survey library 66, data from legacy system 22, and other data related to vehicle components 12 to assist in design and/or maintenance of asset 14 having component 12. Database 34 is configured to enable access of component data in response to the survey configuration 68 of asset 14. Using a feature learning process (not shown), data analyzer 86 is configured to apply recognition algorithms to 2D imagery to build database 34 having parameters peculiar to individual components 12.

Data analyzer 86 is configured to compare survey configuration 68 to database 34 to identify component 12. For example, survey configuration 68 of component 12 may include multiple photographs of the component 12. Using known techniques including attribute recognition (e.g., algorithms similar to those used for face recognition, fingerprinting, etc.), survey configuration imagery (e.g., photographs, etc.) may be matched to attribute 38 in database 34 of component 12 (from the survey library 66). The comparison results in a conclusive data acquisition if a match is successful or an inclusive acquisition if a match is not successful with 2D imagery in database 34 of components 12. For example, a wheel may be identified by a component 12 identifier shown in attribute of component 12 (and extracted via character recognition).

In the exemplary embodiment, a numerical analysis is performed when matching the survey configuration 68 to the survey library 66, which may result in a match score (not shown). The match score may then be compared to a threshold value, where the match score indicates a match is made if it reaches or exceeds the threshold score. If a match is not made, or an insufficient match score is obtained, additional data may be required. The additional data may be obtained by human interaction, further surveys, and so forth. If additional data is necessary, the data may be used to enhance database 34 of components 12 upon completion of the acquisition of addition data. Data analyzer 86 updates known data to enhance the system for future use.

If a match is successful and additional data is not desired or necessary, then data analyzer 86 continues to determine position data. The position data may enable assembling attributes of components 12 into a 3D model. In some embodiments, the position data may include position information from other data sources, such as CAD data 70. Position data may also be derived from the 2D imagery when the position of the imaging device (e.g., digital camera, x-ray, etc.) is known. For example, when cameras are positioned in known positions relative to a component (fixed camera positions, known positions of movable cameras attached to a movable arm, track, etc.) the position of component 12 may be derived from collected data to enable assembling the 3D model.

Data analyzer 86 is configured to determine the identity of one or more components 12 from the survey configuration 68 to create configuration record 18. Configuration record 18 includes a component identifier (e.g., component number, component name), component position data, and/or other data associated with the component, assembly, or vehicle. Ultimately, via the configuration builder 88, the configuration information may be used to generate revised BOM 74, or when including position data, the configuration information may be used to generate the 3D model of asset 14.

Figure 7A:
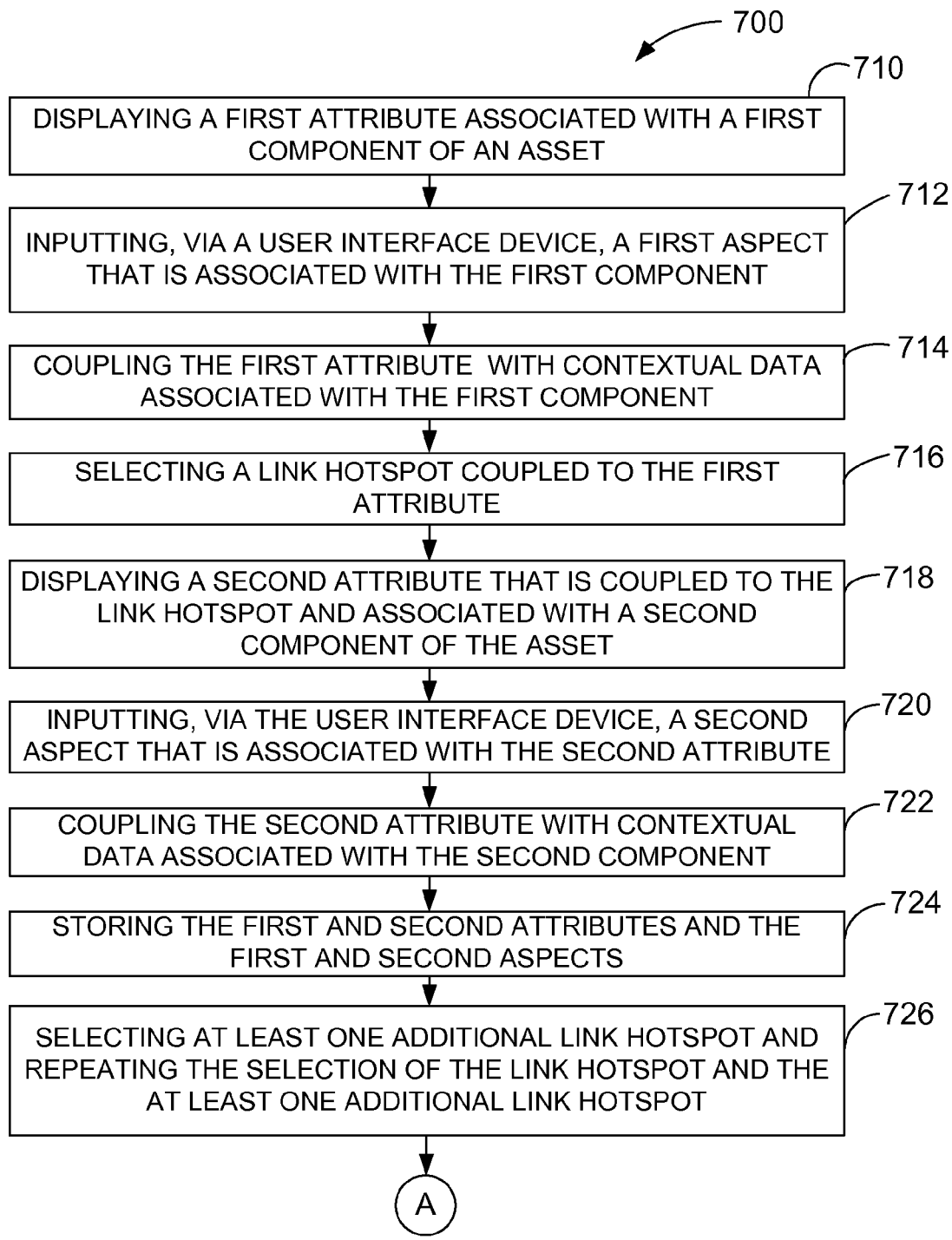
FIG. 7 illustrates a flow chart of an exemplary method that may be implemented to record an exemplary configuration system.
Figure 7B:
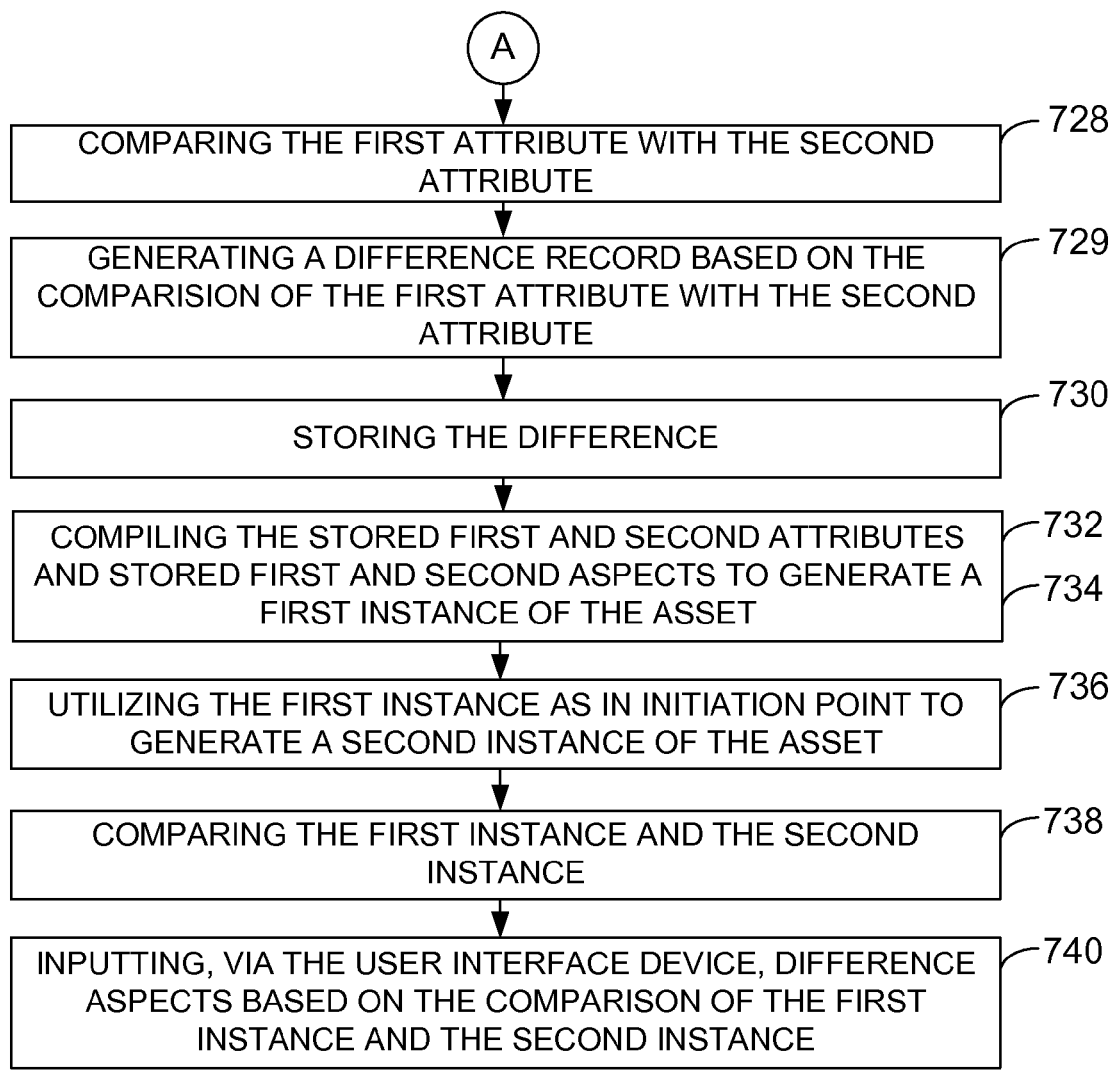

FIG. 7 illustrates an exemplary method 700 of generating configuration record 18 of asset components 12 via user interface device 16. During operations such as, but not limited to, design, maintenance, repair and/or replacement operations, user interface device 16 is utilized to facilitate generating, acquiring, organizing, recording, display and/or comparing attributes associated with asset components 12. In the exemplary method, first attribute 40 that is associated with first component 12 is acquired 710. Method includes inputting 712, via user interface device 16, first aspect 42 that is associated with first component 12. In the exemplary method, first aspect 42 is coupled 714 to first attribute 40 with contextual data 44 associated with first component 12.

Link hotspot 28 which is coupled to first attribute 40 is selected 716 and second attribute 46 associated with second component 12 is acquired 718. Method includes inputting 720, via user interface device 16, second aspect 43 that is associated with second component $12_2$. In the exemplary embodiment, second aspect 42 is coupled 722 to second attribute 46 with contextual data 44 associated with second component $12_2$. First and second attribute 40 and 46 and respective first and second aspects 42 and 43 are stored 724 in database 34 of user interface device 16.

In the exemplary method, a plurality of link hotspots 28 is coupled to second attribute 46 and/or to subsequent attributes $46_n$. Method 700 includes selecting 726 at least one additional link hotspot 28 of the plurality of link hotspots 28 that are coupled to second attribute 46 and/or subsequent attributes 46, via user interface device 16. User interface device 16 is configured to facilitate repeating the selection of link hotspots 28 and acquire subsequent attributes associated with asset components 12.

After first and second attributes 40 and 46 are stored, method 700 includes comparing 728 first attribute 40 and second attribute 46 via user interface device 16. Method generates 729 difference record 55 based on the comparison of first attribute 40 and second attribute 46. Method further includes storing 730 difference record 55 in database 34.

In the exemplary embodiment, method 700 includes processor compiling 732 stored first and second attributes 40 and 46 and associated first and second aspects 42 and 43 to facilitate generating and/or recording 734 first instance of asset 14. Method 700 includes utilizing 736 first instance 50 as initiation point 54 to facilitate generating and/or recording second instance 52 of asset 14. First instance 50 and second instance 52 are compared 738 to facilitate inputting 740, via user interface device 16, difference aspects based on the comparison of first instance 50 and second instance 52.

Figure 8:
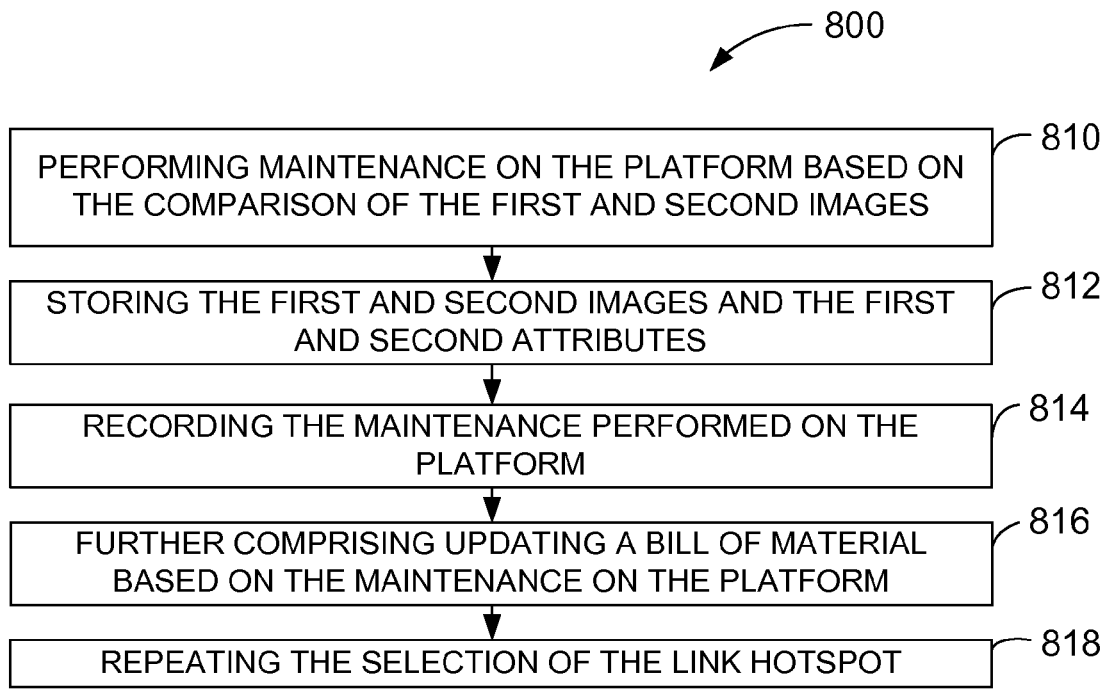
FIG. 8 illustrates a flow chart of an exemplary method that may be implemented to facilitate maintenance on an exemplary asset.

FIG. 8 illustrates an exemplary method 800 of evaluating asset component 12 for maintenance. After system 10 generates asset configuration record 18 (shown in FIG. 7), method 800 includes evaluating 810 needs of asset 14 based on comparison of first attribute 40 and second attribute 46. In one embodiment, method 800 includes performing maintenance 811 on asset 14. Method 800 further includes storing 812 first attribute 40 and second attribute 46 in database 34. After maintenance, attributes 40 and 46 are recorded in database 34. Method 800 includes updating 816 bill of material 74 based on the maintenance performed on asset 14. Method 800 repeats selection 818 of link hotspots 28 to continue evaluating maintenance needs for other components 12.

Figure 9:
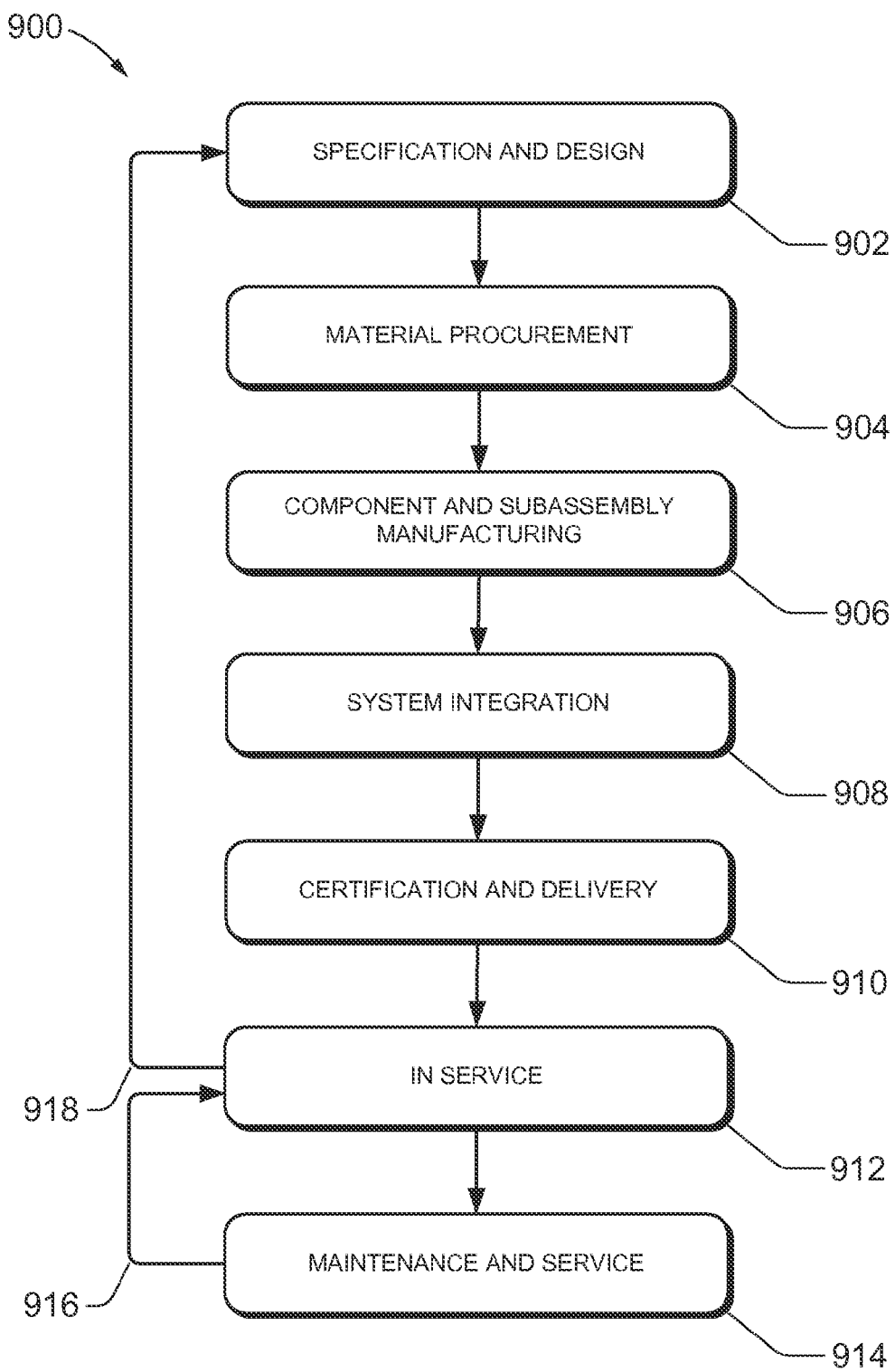
FIG. 9 illustrates a flow diagram of an exemplary vehicle production and service methodology.
Figure 10:
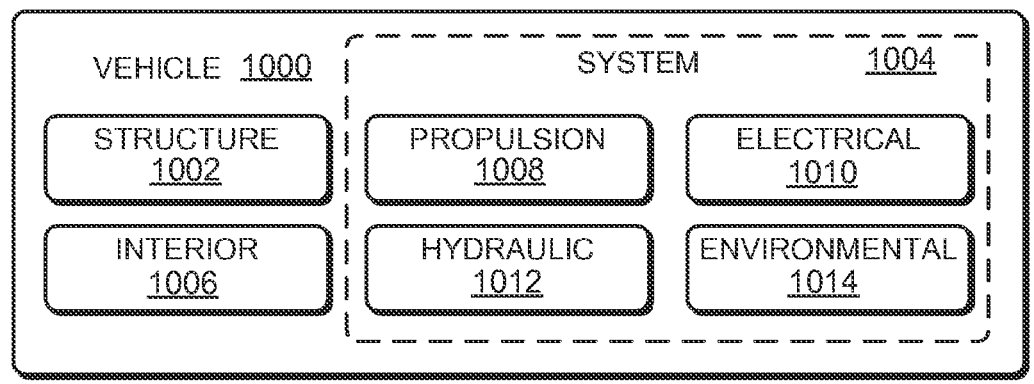
FIG. 10 illustrates a schematic diagram of an exemplary vehicle asset.

Embodiments of the disclosure may be described in the context of an illustrative vehicle manufacturing and service process 900 as shown in FIG. 9 and an illustrative vehicle 1000 as shown in FIG. 10. During pre-production, exemplary process 900 may include specification and design 902 of vehicle 1000 and material procurement 904. During production, component 12 and subassembly manufacturing 906 and system integration 908 of vehicle 1000 are conducted. Thereafter, vehicle 1000 may go through certification and delivery 910 in order to be placed in-service 912. While in-service by a customer, vehicle 1000 is scheduled for routine maintenance and service 914 (which may also include modification, reconfiguration, refurbishment, and so on). In accordance with various embodiments, an analysis system (not shown) may be employed at the in-service 912 in anticipation of vehicle maintenance and service 914. In some embodiments, vehicle 1000 may undergo maintenance during scheduled or unscheduled intervals via a route 916 that links the in-service operation 912 and the maintenance and service operations 914 to create a recursive process. Vehicle 1000 may also undergo an upgrade via a route 918 that links the in-service operation 912 and the specification and design operation 902 to create another recursive process. The upgrade may include an installation of a new system or component on an existing vehicle.

Each of the processes of method 900 may be performed or carried out by a system integrator, a third party, and/or an operator (e.g., a customer). For the purposes of this description, a system integrator may include without limitation any number of vehicle manufacturers and major-system subcontractors; a third party may include without limitation any number of venders, subcontractors, and suppliers; and an operator may be an airline, leasing company, military entity, service organization, and so on.

The various techniques (e.g., the processes 400, 500, and 600) embodied herein may be employed during any one or more of the stages of the production and service method 900. For example, one or more of embodiments of fleet maintenance application, may be utilized while vehicle 1000 is in-service 912 and/or at the maintenance and service 914.

As shown in FIG. 10, vehicle 1000 includes a structure (frame) 1002 with a plurality of systems 1004 and an interior 1006. Examples of systems 1004 include one or more of a propulsion system 1008, an electrical system 1010, a hydraulic system 1012, and an environmental system 1014. Any number of other systems may be included. The principles of the invention may be applied many industries, such as the aerospace industry, the automotive industry, and so forth.

Figure 11:
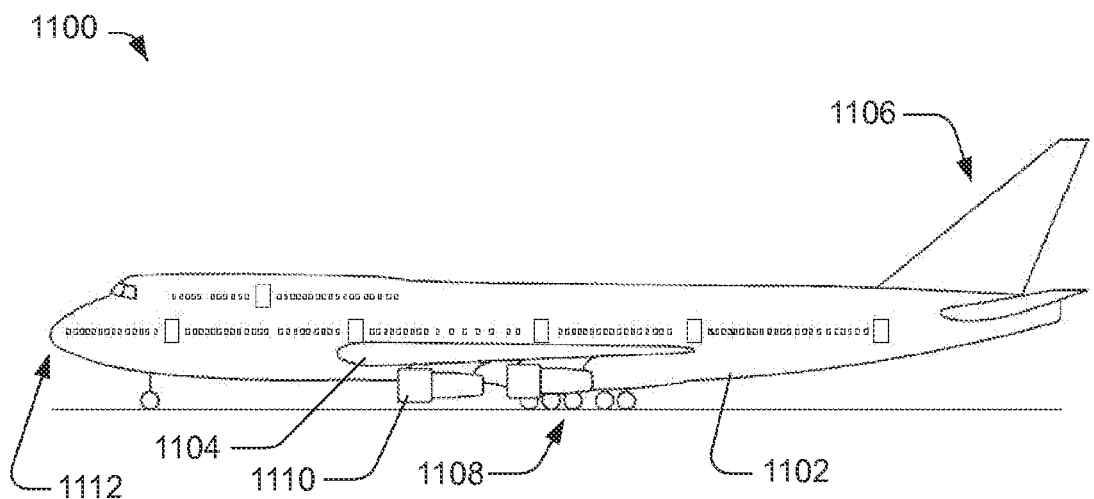
FIG. 11 illustrates a side elevational view of an exemplary vehicle asset.

FIG. 11 is a side elevational view of an illustrative aircraft 1100, which may experience fleet maintenance that is performed using the techniques disclosed herein. The use of data analyzer 86, surveyor 26, and legacy system 22 (shown in FIG. 1) facilitated identifying parts to create the revised BOM 74 and create the 3D model using 2D imagery and position information as disclosed herein.

In this embodiment, the aircraft 1100 includes a fuselage 1102 including wing assemblies 1104, a tail assembly 1106, and a landing assembly 1108. The aircraft 1100 further includes one or more propulsion units 1110, a control system 1112, and a host of other systems and subsystems that enable proper operation of the aircraft 1100. One should appreciate that many parts included in an aircraft may be identified using 2D imagery using the techniques disclosed herein. In general, the various components 12 and subsystems of the aircraft 1100 may be of known construction and, for the sake of brevity, will not be described in detail herein.

Although the aircraft 1100 shown in FIG. 11 is generally representative of a commercial passenger aircraft; however, the embodiments described herein may be applied to the design, maintenance, manufacture, and assembly of other passenger aircraft, fighter aircraft, cargo aircraft, rotary aircraft, and any other types of manned or unmanned aircraft, as well as other types of vehicles disclosed herein.

Exemplary embodiments of systems and methods for a configuration system are described above in detail. The systems and methods are not limited to the specific embodiments described herein, but rather, components of systems and/or steps of the method may be utilized independently and separately from other components and/or steps described herein. Each component and each method step may also be used in combination with other components and/or method steps. Although specific features of various embodiments may be shown in some drawings and not in others, this is for convenience only. Any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method of recording a configuration record for components of an asset, said computer-implemented method comprising:
    displaying a first attribute associated with a first component of the asset;
    inputting, via a user interface device, a first aspect that is associated with the first component;
    determining a link hotspot on the first attribute, wherein the link hotspot is at a location of a second component of the asset;
    coupling a second attribute associated with a second component of the asset to the link hotspot;
    inputting, via the user interface device, a second aspect that is associated with the second attribute; and
    storing the first and second attributes and the first and second aspects.

2. The computer-implemented method of claim 1 wherein inputting the first aspect comprises coupling the first attribute with contextual data associated with the first component and inputting the second aspect comprises coupling the second attribute with contextual data associated with the second component.

3. The computer-implemented method of claim 1 further comprising comparing the first attribute with the second attribute.

4. The computer-implemented method of claim 3 further comprising generating a difference record based on the comparison of the first attribute with the second attribute.

5. The computer-implemented method of claim 1 further selecting at least one additional link hotspot coupled to the second attribute.

6. The computer-implemented method of claim 5 further comprising repeating the selection of the link hotspot and the at least one additional link hotspot.

7. The computer-implemented method of claim 1 further comprising coupling the stored first and second attributes and stored first and second aspects to record a first instance of the asset.

8. The computer-implemented method of claim 7 further comprising utilizing the first instance as an initiation point to generate a second instance of the asset.

9. The computer-implemented method of claim 8 further comprising comparing the first instance and the second instance.

10. The computer-implemented method of claim 9 further comprising generating, via the user interface device, difference aspects based on the comparison of the first instance and the second instance.

11. A computer system to record a configuration record for components of an asset, said computer system comprising:
    a user interface device comprising a screen configured to display a first attribute of a first component of the asset;
    a database coupled to said user interface device, said database comprising an aspect associated with each of said plurality of attributes; and
    a processor coupled to said user interface device and said database, said processor configured to determine a link hotspot on said first attribute at a location of a second component of the asset, to couple said aspect to said link hotspot, and to couple a second attribute associated with the second component of the asset to said link hotspot.

12. The computer system of claim 11 wherein said user interface is configured to:
    input a first aspect that is associated with the first component;
    select the link hotspot coupled to said first attribute;
    display the second attribute associated with the second component of the asset;
    input a second aspect that is associated with said second attribute; and
    store said first and second attributes and said first and second aspects.

13. The computer system of claim 12 wherein said first and second attributes comprise at least one of a two-dimensional image, a non-two dimensional image, a photograph, a backscatter data, a non-destructive evaluation data, an ultrasound attribute, and a video attribute.

14. The computer system of claim 12 wherein said first and second aspects comprise contextual data relating to at least one of said first and second attributes.

15. The computer system of claim 14, wherein said contextual data comprises at least one a serial number, a component position and a component material.

16. A computer-implemented method of evaluating a component of an asset, said computer-implemented method comprising:
    displaying a first attribute associated with a first component of the asset;
    inputting, via a user interface device, a first aspect that is associated with the first component;
    determining a link hotspot on the first attribute, wherein the link hotspot is at a location of a second component of the asset;
    coupling a second attribute associated with a second component of the asset to the link hotspot;
    inputting, via the user interface device, a second aspect that is associated with the second attribute;
    comparing the first attribute and the second attribute; and
    performing an evaluation on the asset based on the comparison of the first and second attributes.

17. The computer-implemented method of claim 16 further comprising storing the first and second attributes and the first and second aspects.

18. The computer-implemented method of claim 16 further comprising performing maintenance on the asset.

19. The computer-implemented method of claim 18 further comprising recording the maintenance performed on the asset.

20. The computer-implemented method of claim 16 further comprising repeating the selection of the link hotspot.

* * * * *